3,146,167
METHOD OF PREPARING SUSTAINED RELEASE
PELLETS AND PRODUCTS THEREOF
Russell John Lantz, Jr., Norristown, Pa., and Manford J. Robinson, Moorestown, N.J., assignors to Smith Kline & French Laboratories, Philadelphia, Pa., a corporation of Pennsylvania
No Drawing. Filed Oct. 5, 1961, Ser. No. 143,045
3 Claims. (Cl. 167—82)

This invention relates to the method of making timed release pharmaceutical pellets and to products thereof.

Prior to this invention the conventional method of preparing individual sustained release pellets of a size of from 250 microns to 2000 microns to be combined into a unit dosage such as in a hard gelatin capsule involved a series of time consuming steps. Briefly these steps are as follows: Spherical pellets containing the medicament must be formed and the following procedure is used. Nonpareil sugar seeds are rotated in a pan and an adhesive coating is applied to the seeds. The medicament is then sprinkled over the wetted seeds and the pellets are dried. This step is repeated until the desired amount of medicament has been adhered to each seed. The next major step is to apply the time delay coating. The desired release characteristic is achieved by varying the thickness of the time delay coating. The pellets are coated in groups, i.e., the first group has a certain thickness of sustained release coating, the next group has more coating applied and so forth until a uniform release rate over 8–12 hours is obtained by combining the various pellets and administering them orally in a unit dosage usually contained in a capsule.

It is evident from this description of the prior art that the prior method of preparation of sustained release pellets entails complicated manufacturing techniques which are difficult to control and do not readily lend themselves to large scale manufacturing. The present techniques require extended development times because of this manufacturing complexity. The preparation of sustained release pellets as outlined above also requires highly skilled workers who are well trained in the coating art. The time required to prepare the sustained release pellets by the well-known present method is at least three days.

In direct contrast the method of this invention is a simple technique for the preparation of individual spherical sustained release pellets of sizes 250 microns to 2000 microns which presents many outstanding advantages. One advantage is that the method of the present invention is a "push button" operation and does not require one highly skilled in the coating art to execute the method. Further, this invention eliminates the necessity of group coating with various thickness of wax. The pellets are all prepared in one batch since the sustained release characteristic of a dosage unit arises from the random dispersal of the medicament as described hereafter. Still further the present invention permits excellent reproducibility, high flexibility, minimum man power and, most important, low manufacturing cost. The method of this invention drastically reduces the time of preparing sustained release pharmaceutical pellets from days to minutes.

The pellets obtained as a result of the method of this invention continuously maintain a desired therapeutic level of a selected medicament over an extended period of time, for example, as long as ten to twelve hours. The pellets are desirably measured to a certain desired dose of medicament and then filled into hard gelatin capsules. Further the pellets obtained by the method of this invention present a minimal release stability problem and are a much more pharmaceutically elegant dosage form than the pellets prepared by prior art methods.

The method of this invention comprises adding the desired medicament to a sustained release lipid material in a molten state to form a slurry. The molten slurry is then atomized through a pressure nozzle and the thus formed particles comprising the sustained release lipid material and medicament are passed through a gas, preferably air, having a temperature lower than that of the atomized particles. The nozzle is adjusted to form particles (droplets) having a mass that when converted to spheres each have a predetermined diameter in the range of from about 250 microns to about 2000 microns. The sprayed particles are passed through the gas until becoming spherical and congealed pellets. The congealed pellets are then collected in a suitable container.

The atomizing of the above mentioned molten slurry is carried out in an apparatus conventionally used for spray atomizing, such as, for example, a spray dryer which is well-known to the art, preferably a tower type spray dryer is employed. The temperature of the gas through which the particles are passed is generally from about 0° C. to about 60° C. Preferably the gas temperature will be from about 10° C. to about 50° C. The pressure nozzle used may be any suitable commercially available nozzles, such as, for example, Spraying Systems Fulljet type. The series ⅛th GG 1 through ⅜th GG 9.5 and ⅛th GG 3001.4 through ⅜th GG 30/4 may be satisfactorily used. Preferably the spray atomizing pressure used is from about 5 pounds per square inch to about 1000 pounds per square inch. Most advantageously the atomizing pressure is from about 25 pounds per square inch to about 500 pounds per square inch. The atomized molten slurry of medicament and, when employed, the filler may be sprayed upwardly or downwardly but is preferably sprayed downwardly in a tower type spray dryer and is preferably allowed to drop in the tower a distance sufficient to enable the composition to congeal. For example, the total distance traveled by a pellet normally may be from about 5 feet to about 40 feet to about 40 feet. Most advantageously the atomized molten composition should travel from about 20 feet to about 30 feet.

The time in seconds during which the particles formed by atomizing the molten slurry are to be passed through the gas in the spray dryer is determined by dividing the total heat to be removed from each particle to congeal it, $Q_t$, by the heat removed from each particle per second, $Q_s$. $Q_t$ is determined from the following formula:

$$Q_t = [C_p(T_m - T_s) + H_f]M_p$$

where:

$Q_t$ = total heat to be removed from a particle (in calories)
$C_p$ = heat capacity of the melted slurry [1] (in cal./gm./° C.)
$T_m$ = temperature of the melted slurry (in ° C.)
$T_s$ = (solidification) or congealing temperature of the melted slurry (in ° C.)
$H_f$ = heat of fusion of the congealed slurry (in cal./gm.)
$M_p$ = mass of the particle (in gm.)

$Q_s$ is determined from the following formula:

$$Q_s = h_m A_s(T_m - T_c)$$

where:

$Q_s$ = heat removed per unit time from a particle (in cal./sec.)
$h_m$ = mean heat transfer coefficient (in cal./sec./cm.²/° C.)

[1] The $C_p$ of the wax or fatty material can be used.

$A_s$ = surface area of the particle (in cm.) [assuming particle to be a perfect sphere]
$T_m$ = temperature of the melted slurry (in ° C.)
$T_c$ = temperature of the gas (in ° C.)

This invention is applicable to any desired solid medicament regardless of its aqueous solubility. By way of example, the solid medicament may be a sympathomimetic agent such as, for example, amphetamine sulfate, dextroamphetamine sulfate, racemic amphetamine sulfate, racemic or d-desoxyphedrine hydrochloride; a tranquilizer such as, for example, chloropromazine, prochlorperazine, or trifluoperazine; an antibiotic agent, such as for example, procaine penicillin, tetracycline, chloramphenicol; a sedative such as phenobarbital, meprobamate; an antispasmodic agent, such as, for example atropine, and an antihistaminic agent such as, for example, chlorprophenpyridamine maleate. The solid medicament will be in the form of a finely divided powder, which may be as finely divided as desired and will be preferably below 200 microns in size.

It will be appreciated, that when desired, inert pharmaceutical fillers may be added to the molten slurry. The filler may be any conventional type, such as, for example, powdered sucrose, lactose, kaolin, mannitol, dicalcium phosphate talc or sodium chloride. Fillers are of particular value when a low dose medicament is employed and is insufficient to bring the total weight to 100%. The inert pharmaceutical filler will be in the form of a finely divided powder, which may be as finely divided as desired and will be preferably below 100 microns in size.

In accordance with this invention the time delay material is a nontoxic, pharmaceutically acceptable, substantially water insoluble lipid material resistant to disintegration in the gastrointestinal tract and providing for a gradual release of the medicament in said tract. Advantageously the time delay or sustained release material is a lipid material which is solid at room temperature, but has a low melting point of from 40° C. to 150° C., preferably 60° C. to 110° C.

The time delay material may be, for example, a wax, a fatty acid, alcohol or ester, alone, or an admixture thereof, or alternatively wax-like water insoluble polymers such as for example polyethylene or polypropylene.

The wax may be paraffin wax; a petrolatum wax; a mineral wax such as ozokerite, ceresin, Utah wax or montan wax; a vegetable wax such as, for example, carnauba wax, Japan wax, bayberry wax, flax way; an animal wax such as, for example, spermaceti; or an insect wax such as beeswax, Chinese wax or shellac wax.

Additionally, the wax material may be an ester of a fatty acid having from 12 to 31 carbon atoms and a fatty alcohol having from 12 to 31 carbon atoms, the ester having a carbon atom content of from 24 to 62, or a mixture thereof. Exemplary are myricyl palmitate, ceryl palmitate, ceryl cerotate, myricyl mellissate, stearyl palmitate, stearyl myristate, lauryl laurate.

The fatty acid may have from 10 to 22 carbon atoms and may be, for example, decenoic, docosanoic, stearic, palmitic, lauric or myristic acid.

The fatty alcohols may have from 10 to 22 carbon atoms and may be, for example, lauryl alcohol, cetyl, stearyl, myristyl, myricyl, arachyl, carnubyl or ceryl alcohol.

The esters may be mono-, di- or triglyceryl esters formed from fatty acids having from 10 to 22 carbon atoms, such as, for example, glyceryl distearate, glyceryl tristearate, glyceryl monostearate, glyceryl dipalmitate, glyceryl tripalmitate, glyceryl monopalmitate, glyceryl dilaurate, glyceryl trilaurate, glyceryl monolaurate, glyceryl didocosanoate, glyceryl tridocosanoate, glyceryl monodocosanoate, glyceryl monocaprate, glyceryl dicaprate, glyceryl tricaprate, glyceryl monomyristate, glyceryl dimyristate, glyceryl trimyristate, glyceryl monodecenoate, glyceryl didecenoate, or glyceryl tridecenoate, hydrogenated castor oil, hydrogenated peanut oil and hydrogenated coconut oil.

The preferred sustained release materials are hydrogenated castor oil, glyceryl monostearate, glyceryl distearate, 12-hydroxystearyl alcohol and microcrystalline wax.

The time delay matrix material as outlined above is present in an amount of from about 35% to about 95% by weight of the total solids of the molten slurry and final product pellet. Preferably the time delay material is present from about 45% to about 75% by weight of the total solids. The balance of material will be medicament and/or filler.

The product of the thus outlined process comprises solid substantially spherical sustained release pellets of lipid composition containing the medicament and filler, when employed, evenly dispersed throughout the sustained release lipid matrix. The sustained release lipid material is present from about 35% to about 95%, preferably from about 45% to about 75% of the total solids. The size of the pellets range from about 250 microns to about 2000 microns. Preferably the pellets range from about 590 microns to about 1200 microns. These pellets when combined randomly into a dosage unit such as a capsule provide a smooth 8 hour release pattern which yields therapeutic activity from 10 to 12 hours.

Although the product as disclosed above gives very satisfactory sustained release properties it has been unexpectedly found that greater uniformity of dissolution of the drug over a substantial period of time such as an 8 hour period is achieved upon the addition of a wicking agent. When the wicking agent is added to the sustained release formulation as hereinbefore described it has been found that a plot of the cumulative amount of medicament dissolved with time is a substantially straight line. In other words, the use of a wicking agent results in a more linear type of dissolution of medicament.

The wicking agent will be in the form of a finely divided powder, which may be as finely divided as desired and will be preferably less than 300 microns in size. The wicking agent may be, for example, any of the following pharmaceutically acceptable nontoxic compounds, alginic acid, calcium pectinic acid amide, carboxymethylcellulose acid, hydroxyethylcellulose, guar gum, locust bean gum, methylcellulose, powdered rayon, sterculia gum, carboxy polymethylene and potassium polyyacrylate. The preferred wicking agents are alginic acid, carboxymethylcellulose acid, guar gum and powdered rayon.

The wicking agent is present in an amount of from 1% to 15% by weight of the total solids. Most advantageously the wicking agent when used, is present in an amount from about 2% to 10% by weight of the total solids in the slurry and final product pellet.

The following examples are not limiting and are used to make obvious to one skilled in the art the full practice of the method of this invention.

*Example 1*

Ingredients: Amounts, gms.
   Amobarbital, U.S.P., powder _____ 45.6
   Stearyl alcohol _____ 54.4

The stearyl alcohol is melted in a suitable container and the temperature is raised to 80° C. The amobarbital is added with rapid and thorough agitation. The composition is mixed to a smooth slurry and the temperature is adjusted to 58° C. for spray congealing.

The spray congealing is conducted in a tower type spray dryer with the gas temperature at 27° C. A ⅜ GG 9.5 Spraying Systems Fulljet pressure nozzle having a standard angle of 50° and an orifice diameter of 7/64″ is used. The spraying pressure is adjusted to 40 pounds per square inch and the spray atomized material is allowed to drop 35 feet to a container at the bottom of the tower spray dryer.

The resultant product is spherical pellets ranging in size from about 250 microns to about 2000 microns.

Example 2

Ingredients: Amounts, gms.
- 12-hydroxystearyl alcohol _____ 45
- Lactose, U.S.P., powder _____ 47
- d-Amphetamine sulfate _____ 8

The 12-hydroxystearyl alcohol is melted in a suitable container and the temperature is raised to 85° C., the d-amphetamine sulfate and lactose are added with rapid and thorough agitation. The composition is mixed to a smooth slurry and the temperature is adjusted to 75° C. for spray congealing.

The spray congealing is accomplished in a conventional tower type spray dryer with the gas temperature at 25° C. A ⅛ GG 3 Spraying Systems Fulljet type pressure nozzle having an angle of 65° with an orifice diameter of .062" is used. The spraying pressure is adjusted to 300 pounds per square inch and the spray atomized material is sprayed upwardly and allowed to fall 25 feet to a container at the bottom of the spray dryer.

The resultant product is spherical pellets ranging in size of from about 250 microns to about 2000 microns.

Example 3

Ingredients: Amounts, gms.
- Phenobarbital, U.S.P., powdered _____ 31
- Sodium chloride (finely powdered) _____ 29
- 12-hydroxystearyl alcohol _____ 40

The 12-hydroxystearyl alcohol is melted in a steam jacketed kettle and the temperature is raised to 85° C. The phenobarbital and sodium chloride are added and thoroughly mixed to a smooth melt. The temperature is then adjusted to 75° C. for spray atomizing.

The melt is spray cooled in a tower spray dryer with the gas temperature at 40° C. using a Spraying Systems Co. Fulljet nozzle, type ⅛ GG 5 at a spraying pressure of 100 pounds per square inch. The spray atomized material is allowed to drop 25 feet.

Example 4

Ingredients: Amounts, percent
- 12-hydroxystearyl alcohol _____ 63.5
- Talc (5 microns) _____ 25.0
- d-Amphetamine sulfate (150 microns) _____ 8.0
- Alginic acid (175 microns) _____ 3.5

The 12-hydroxystearyl alcohol is melted in a suitable container and the temperature is raised to 85° C. The d-amphetamine, talc and alginic acid are added with rapid and thorough agitation. The composition is mixed to a smooth slurry and the temperature is adjusted to 75° C. for spray congealing.

The spray congealing is accomplished in a conventionally tower type spray dryer with the gas temperature at 25° C. A ⅛ GG 3 Spraying Systems Fulljet type pressure nozzle having an angle of 65° with an orifice diameter of .062" is used. The spraying pressure is adjusted to 300 pounds per square inch and the spray atomized material is sprayed upwardly and allowed to fall 25 feet to a container at the bottom of the spray dryer.

The resultant product is spherical pellets ranging in size of from about 250 microns to about 2000 microns.

Example 5

Ingredients: Amounts, percent
- 12-hydroxystearyl alcohol _____ 68.5
- Talc (5 microns) _____ 18.5
- d-Amphetamine sulfate (150 microns) _____ 8.0
- Carboxymethylcellulose acid (180 microns) ___ 5.0

The 12-hydroxystearyl alcohol is melted in a suitable container and the temperature is raised to 85° C. The d-amphetamine, talc and carboxymethylcellulose acid are added with rapid and thorough agitation. The composition is mixed to a smooth slurry and the temperature is adjusted to 75° C. for spray congealing.

The spray congealing is accomplished in a conventionally tower type spray dryer with the gas temperature at 40° C. using a Spraying Systems Co. Fulljet nozzle, type ⅛ GG 5 at a spraying pressure of 100 pounds per square inch. The spray atomized material is allowed to drop 25 feet.

Example 6

Ingredients: Amounts, gms.
- Amobarbital, U.S.P., powder (150 microns) ___ 45.6
- Stearyl alcohol _____ 49.4
- Alginic acid (175 microns) _____ 5.0

The stearyl alcohol is melted in a suitable container and the temperature is raised to 80° C. The amobarbital, and alginic acid are added with rapid and thorough agitation. The composition is mixed to a smooth slurry and the temperature is adjusted to 60° C. for spray congealing.

The spray congealing is conducted in a tower type spray dryer with the gas temperature at 27° C. A ⅜ GG 9.5 Spraying Systems Fulljet pressure nozzle having a standard angle of 50° and an orifice diameter of ⁷⁄₆₄" is used. The spraying pressure is adjusted to 40 pounds per square inch and the spray atomized material is allowed to drop 35 feet to a container at the bottom of the tower spray dryer.

The resultant product is spherical pellets ranging in size from about 250 microns to about 2000 microns.

Example 7

Ingredients: Amounts, percent
- 12-hydroxystearyl alcohol _____ 63.5
- Talc (5 microns) _____ 18.5
- d-Amphetamine sulfate (150 microns) _____ 8.0
- Powdered rayon (200 microns) _____ 10.0

The 12-hydroxystearyl alcohol is melted in a suitable container and the temperature is raised to 85° C. The d-amphetamine, talc and powdered rayon are added with rapid and thorough agitation. The composition is mixed to a smooth slurry and the temperature is adjusted to 85° C. for spray congealing.

The spray congealing is accomplished in a conventional tower type spray dryer with the gas temperature at 25° C. A ⅛ GG 3 Spraying Systems Fulljet type pressure nozzle having an angle of 65° with an orifice diameter of .062" is used. The spraying pressure is adjusted to 300 pounds per square inch and the spray atomized material is sprayed upwardly and allowed to fall 25 feet to a container at the bottom of the spray dryer.

The resultant product is spherical pellets ranging in size of from about 250 microns to about 2000 microns.

Example 8

Ingredients: Amounts, gms.
- Phenobarbital, U.S.P., powdered (100 microns) _____ 31
- Sodium chloride (finely powdered) (10 microns) _____ 29
- 12-hydroxystearyl alcohol _____ 40

The 12-hydroxystearyl alcohol is melted in a steam jacketed kettle and the temperature is raised to 85° C. The phenobarbital and sodium chloride are added and thoroughly mixed to a smooth melt. The temperature is then adjusted to 75° C. for spray atomizing.

The melt is spray cooled in a tower spray dryer with the gas temperature at 40° C. using a Spraying Systems Co. Fulljet nozzle, type ⅛ GG 5 at a spraying pressure of 100 pounds per square inch. The spray atomized material is allowed to drop 25 feet.

This is a continuation in part application based on our co-pending patent application Serial No. 65,262, filed October 27, 1960, and now abandoned.

What is claimed is:

1. In the method of preparing solid lipid sustained release pharmaceutical pellets having a solid medicament randomly dispersed throughout a lipid material resistant to disintegration and slowly dispersible in the gastrointestinal tract, the improvement which consists essentially of the steps of:

(a) forming a molten slurry of solid medicament randomly dispersed throughout a lipid material, said lipid material being capable of solidification at room temperature, resistant to disintegration and slowly dispersible in the gastrointestinal tract;

(b) atomizing the molten slurry through a pressure nozzle having a discharge opening forming atomized droplet particles of medicament containing lipid material having a mass that when converted to spherical pellets, each of said pellets has a predetermined diameter in the range of from about 250 microns to about 2,000 microns, and;

(c) passing the molten slurry of atomized droplet particles of medicament containing lipid material through air having a temperature lower than the solidification temperature of the lipid material until the atomized molten droplet particles congeal as solid spherical pellets having solid medicament randomly dispersed throughout the lipid material.

2. In the method of preparing solid lipid sustained release pharmaceutical pellets having a solid medicament and a wicking agent selected from the group consisting of alginic acid, carboxymethylcellulose acid, guar gum and powdered rayon randomly dispersed throughout a lipid material resistant to disintegration and slowly dispersible in the gastro-intestinal tract, the improvement which consists essentially of the steps of:

(a) forming a molten slurry of solid medicament and a wicking agent selected from the group consisting of alginic acid, carboxymethylcellulosic acid, guar gum and powdered rayon randomly dispersed throughout a lipid material, said lipid material being capable of solidification at room temperature, resistant to disintegration and slowly dispersible in the gastro-intestinal tract;

(b) atomizing the molten slurry through a pressure nozzle having a discharge opening forming atomized droplet particles of lipid material containing medicament and said wicking agent, said droplet particles each having a mass that when converted to spherical pellets, each of said pellets has a predetermined diameter in the range of from about 250 microns to about 2,000 microns, and;

(c) passing the molten slurry of atomized droplet particles of lipid material containing medicament and said wicking agent through air having a temperature lower than the solidification temperature of the lipid material until the atomized molten droplet particles congeal as solid spherical pellets having solid medicament and wicking agent randomly dispersed through said lipid material.

3. An oral pharmaceutical preparation having sustained release properties comprising solid substantially spherical lipid pellets having a solid medicament and a wicking agent randomly dispersed therein, said pellets having a diameter of from about 250 microns to about 2,000 microns, made in accordance with claim 2.

References Cited in the file of this patent

UNITED STATES PATENTS

| | | |
|---|---|---|
| 2,540,979 | Clymer | Feb. 6, 1951 |
| 2,738,303 | Blythe | Mar. 13, 1956 |
| 2,793,979 | Svedres | May 28, 1957 |
| 2,798,838 | Robinson | July 9, 1957 |
| 2,805,977 | Robinson | Sept. 10, 1957 |
| 2,851,453 | Kennon et al. | Sept. 9, 1958 |
| 2,875,130 | Grass et al. | Feb. 24, 1959 |
| 2,895,880 | Rosenthal | July 21, 1959 |
| 2,921,883 | Reese et al. | Jan. 19, 1960 |
| 2,951,792 | Swintosky | Sept. 6, 1960 |
| 2,957,804 | Shuyler | Oct. 25, 1960 |
| 2,971,889 | Swintosky | Feb. 14, 1961 |
| 2,986,475 | Mesnard et al. | May 30, 1961 |

OTHER REFERENCES

Chapman et al: "Physiological Availability of Drugs in Tablets," Canad. M.A.J., vol. 76, pages 102–106, Jan. 15, 1957.

Dragstedt: "Oral Medication With Preparations for Prolonged Action," J.A.M.A., vol. 168, No. 12, pages 1652–1655, Nov. 22, 1958.

Lazarus et al.: "Oral Prolonged Action Medicaments: Their Pharmaceutical Control and Therapeutic Aspects," J. of Pharm. and Pharmacology, vol. 11, No. 5, pages 257–290 (pages 266–271, 277–279, and 285–288 are especially pertinent to In Vivo Tablet Availability of Drugs), May 1959.

Campbell et al. "Oral Prolonged-Action Medication," Practitioner, vol. 183, pages 758–765, December 1959.